United States Patent
Erb et al.

(10) Patent No.: US 10,118,539 B2
(45) Date of Patent: Nov. 6, 2018

(54) END PLATE FOR A REAR SPOILER OF A VEHICLE

(71) Applicant: Dr. Ing. h.c. F. Porsche Aktiengesellschaft, Stuttgart (DE)

(72) Inventors: Thiemo Erb, Stuttgart (DE); Markus Brunner, Sachsenheim (DE); Erik Samel, Böblingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/784,298

(22) Filed: Oct. 16, 2017

(65) Prior Publication Data

US 2018/0105100 A1 Apr. 19, 2018

(30) Foreign Application Priority Data

Oct. 17, 2016 (DE) .................... 10 2016 119 699

(51) Int. Cl.
| | |
|---|---|
| B60Q 1/00 | (2006.01) |
| B60Q 1/26 | (2006.01) |
| B60Q 1/22 | (2006.01) |
| B60Q 1/34 | (2006.01) |
| B60Q 1/44 | (2006.01) |
| B62D 35/00 | (2006.01) |
| F21V 23/06 | (2006.01) |

(52) U.S. Cl.
CPC ............ *B60Q 1/2661* (2013.01); *B60Q 1/22* (2013.01); *B60Q 1/34* (2013.01); *B60Q 1/44* (2013.01); *B62D 35/007* (2013.01); *F21V 23/06* (2013.01)

(58) Field of Classification Search
CPC .......... B60Q 1/22; B60Q 1/2661; B60Q 1/34; B60Q 1/44; B60Q 1/24; B60Q 1/2607; B60Q 1/30; B60Q 1/38; B60Q 1/50; B60Q 2400/20; B60Q 2400/30; B60Q 2400/40; B62D 35/007; B62D 35/00; F21V 23/06; F21S 43/13; F21S 43/145; F21S 48/214; F21S 48/217
USPC ....................................................... 362/549
See application file for complete search history.

(56) References Cited

U.S. PATENT DOCUMENTS

| | | | | |
|---|---|---|---|---|
| 2005/0110301 A1* | 5/2005 | Dringenberg | ........ | B62D 35/007 296/180.5 |
| 2007/0194903 A1* | 8/2007 | Walasik | ............... | B60Q 1/2661 340/465 |
| 2009/0086499 A1* | 4/2009 | Lin | ....................... | B62D 35/007 362/487 |
| 2015/0151673 A1* | 6/2015 | Salter | ..................... | F21S 43/13 362/510 |

* cited by examiner

*Primary Examiner* — Claude J Brown
(74) *Attorney, Agent, or Firm* — RatnerPrestia

(57) ABSTRACT

An end plate for a rear spoiler of a vehicle, having a basic body with a fastening portion for fastening to an air directing wing of the rear spoiler. A first electric conducting body and, insulated electrically therefrom, a second electric conducting body are arranged at least in sections within the basic body. An electric light element which is electrically conductively connected to the two conducting bodies is furthermore arranged on the basic body.

11 Claims, 4 Drawing Sheets

END PLATE FOR A REAR SPOILER OF A VEHICLE

CROSS-REFERENCE TO RELATED APPLICATIONS

This application claims priority to German Patent Application No. DE 0 2016 119 699.1, filed Oct. 17, 2016, the content of such application being incorporated by reference herein in its entirety.

FIELD OF THE INVENTION

The present invention relates to an end plate for a rear spoiler of a vehicle, and to a rear spoiler for a vehicle.

BACKGROUND OF THE INVENTION

It is known that vehicles are equipped with rear spoilers in order to improve the driving dynamics in respect of the flow of head wind around the vehicle. In order to ensure this, the rear spoiler is customarily equipped with at least one air directing wing which is responsible for influencing the air flow. The air directing wing is frequently provided on the two lateral end portions with what are referred to as end plates which preferably have a vertical or substantially vertical orientation.

It is disadvantageous in the known solutions that the end plates of the rear spoilers are purely passive elements. Although said end plates can provide additional influence on the flow conditions in the region of the rear spoiler, they, are not capable of sensing active signaling functions of the vehicle. This is based in particular on the fact that they are particularly lightweight components which can be produced, for example, from a plastics material.

SUMMARY OF THE INVENTION

Described herein is an end plate of a rear spoiler, which end plate can sense a signaling function for the vehicle in a cost-effective and simple manner.

Features and details which are described in conjunction with the end plate according to aspects of the invention also apply in conjunction with the rear spoiler according aspects of the invention, and vice versa in each case, and therefore, with regard to the disclosure, reference is always, and can always be, made reciprocally to the individual aspects of the invention.

According to aspects of the invention, an end plate for a rear spoiler of a vehicle is provided. Such an end plate has a basic body with a fastening portion for fastening to an air directing wing of the rear spoiler. A first electric conducting body and, insulated electrically herefrom, a second electric conducting body are arranged here at least in sections within the basic body. An electric light element which is electrically conductively connected to the two conducting bodies is furthermore arranged on the basic body.

An end plate of a rear spoiler, which end plate, in contrast to the known solutions, can sense an active signaling function, is therefore involved here according to aspects of the invention. A signaling function here is in particular a visual signaling function which is provided by the electric light element. As will be explained in more detail further on, signaling functions can be vehicle functions which inform other traffic participants about certain driving states. Examples which may be mentioned here are a brake light function, a direction indicator function or position light functions.

In order now to be able to provide the activity of the end plate by means of the electric light element, an electrical contact for the electric light element has to be provided. In order at the same time, however, to be able to form the rear spoiler to be as light and cost-effective as possible, said electric contact is formed at least in sections within the basic body of the end plate. In the simplest case, the first electric conducting body and/or the second electric conducting body can be formed by corresponding electric cables. The electric insulation of said two conducting bodies is therefore provided by the corresponding insulation of the cables. However, it may be advantageous if the two electric conducting bodies have a fixed or substantially fixed form such that they can make a stabilizing contribution to the mechanical stability of the end plate and therefore of the entire rear spoiler. This mechanical stabilizing effect is therefore a secondary function of the two conducting bodies which are otherwise provided for the primary function of electrical contact. The conducting bodies here can be of both different and identical or substantially identical design to each othe.

According to aspects of the invention, the basic body in particular serves to provide the electric insulation between the two electric conducting bodies. Of course, however, separate insulating means can also be provided in order to be able to provide this electrically insulating effect between the two conducting bodies. If more than two conducting bodies are necessary for an electrical contact, the arranging of a third electric conducting body or further electric conducting bodies in the same manner is, of course, also conceivable or expedient within the scope of the present invention for the electrically conductive connection.

Owing to the fact that an electric light element is now connected in eta electrically conductive manner to the two conducting bodies, the two poles of the electric light element are accordingly each in electrical contact with one of the two electric conducting bodies. If a connection to a supply line is now ensured on the opposite side of the conducting body, as will he also explained further on, the electric light element via the two electric conducting bodies becomes part of a current circuit which is in particular of switchable design. An end plate which not only has an electric right element but, furthermore, already has the two electric conducting bodies at least in sections within the basic body for electrical contact with, or the electrically conductive connection to, the electric light element is therefore provided in a cost-effective and simple manner. This results in reduced complexity of the entire system, in addition to simple and cost-effective production, in particular, the external dimensions of the end plate can be kept identical or substantially identical in comparison to the known passive end plates. An aerodynamic modification of the end plate is therefore unnecessary; on the contrary, the aerodynamic functionality of the end plate can be retained while at the same time the electric light element adds the additional signaling function to the end plate.

The electric light element can be fastened here directly or indirectly to the basic body. The fastening can also take place to the conducting bodies as will also be explained in more detail further on. In particular, the electric light element is arranged with reversible fastening to the basic body in the desired manner. The electric light element is preferably positioned such that improved inspection of the electric light element from outside the vehicle is possible. The end plate is customarily of plate-like design, and therefore the electric light element can at least partially extend along the end edge of said end plate. A flat and edge-shaped design of the electric light element is therefore possible in order to be able to provide diverse signaling functions.

It can be of advantage if, in the case of an end plate according to aspects of the invention, the first conducting body and the second conducting body each have a contact portion for electrical contact with one supply line each, wherein the contact portions are arranged in particular on the fastening portion. Contact portions are therefore those portions of the conducting bodies which are provided for the electrical connection and therefore the electrical contact with one supply line each. Normally, in the case of a two-pole connection to the electric light element, each of the two conducting bodies corresponds to one electric pole. Accordingly, a separate supply line assigned to said pole and extending, for example, through or along the air directing wing is also necessary for each conducting body. Of course, a plug-in contact may also be preferred for the electrical contact. It is thus possible for the respective basic body and therefore the entire end plate to be plugged onto the two end sides of a fastened air directing wing in a simple and cost-effective manner and therefore also for the electrical contact of the contact portions with the respective supply line also to be formed automatically and especially simultaneously.

In the case of an end plate according to the prey us paragraph, it is possible for the two contact portions to protrude over a side surface of the basic body in the direction o the air directing wing. This protrusion should be understood as meaning in particular a design of said contact portions bent substantially by 90° in relation to a flat extent of the rest of said two conducting body. In other words, the contact portions extend beyond the side surface of the basic body in the direction of the air directing wing or, when the air directing wing is mounted on the end plate, in an associated mating basic body of the air directing wing. As has been explained in the previous paragraph, the contact portion can therefore form the desired electrical contact substantially automatically, for example by form-fitting latching or penetrating into corresponding mating contact portions of the air directing wing. This results i t a particularly simple, efficient, and rapid possibility of mounting the two end plates on an air directing wing.

It is furthermore of advantage if, in the case of an end plate according to aspects of the invention, the two conducting bodies each have a connection portion for the electrically conductive connection to the light element and for the fastening of the light element.

The connection portion therefore now serves two functions. It is firstly the electrically conductive connection in order to supply the light element with electric current for the operability. Secondly, the connection portion is also responsible for the fastening of the light element. This may be the sole fastening and not the sole fastening of the light, element. In particular, said fastening may be a reversible fastening. It is also conceivable for an electric light element to be fastened substantially exclusively to the respective connection portion, in particular reversibly, and therefore, in the event of a defect of corresponding light means within the electric light element, said electric light element can simply be replaced by undoing the fastening to the connection portion. One possibility of the fastening function is what is referred to as a snap and latch closure. Of course, however, other fastening methods are also conceivable or are freely combinable with one another.

It can likewise be of advantage if, in the case of an end plate according to aspects of the invention, at least one of the two conducting bodies has a flat, in particular a plate-like extent. In other words, the flat extent is provided with a relatively low thickness, and therefore, in the case of an end plate which likewise has a flat, in particular plate-like extent, the associated conducting bodies are oriented over the entire three-dimensional geometry of the end plate. This results in the end plate being able to be formed as a thin or flat end plate, and therefore the desired aerodynamic function can, be sensed by the end plate in an identical or substantially identical manner as in the known solutions. In addition to the particularly flat and therefore cost-effective and efficient form, the flat or plate-like extent results in mechanical stabilization of the end plate. The conducting body thus serves in its secondary function to increase a mechanical stability of the end plate when an airflow of the vehicle flows around the latter.

It is furthermore of advantage, if, in the case of an end plate according to the previous paragraph, at least one conducting body has a perforated structure for reducing the weight. In particular if mechanical stabilization is desired, as has been explained in the previous paragraph, a correspondingly large surface is provided for this stabilizing effect by the individual conducting bodies. Since in the case of vehicles, in particular in the case of sports vehicles, which are equipped with corresponding rear spoilers, the weight is often a crucial factor, the design of a perforated structure is a particularly advantageous possibility of being able to ensure the additional functionality of the end plate according to aspects of the invention without a high additional weight. The perforated structure is formed here in particular with one hole, preferably with two or more holes, for reducing the weight. The individual holes can be introduced here into the conducting bodies in an identical or different size. The holes preferably extend transversely with respect to the flat extent or transversely with respect to the plate-like extent of the respective conducting body. The perforated structure can be designed here in particular as a regular perforated structure.

Furthermore, it is of advantage in the case of an end plate according to aspects of the invention, the basic body has a plastics material, in particular is substantially composed of a plastics material. For example, this can be made here of a foam-like plastics material, for example polyurethane foam. The use of plastics material results in particularly light and cost-effective basic bodies and therefore in a correspondingly light and cost-effective embodiment of the end plate. The plastics material is preferably formed in an electrically insulating manner, and therefore it forms the electric insulating function between the two separate conducting bodies which are embedded in the basic body made from said plastics material.

Furthermore, it may be of advantage if, in the case of an end plate according to aspects of the invention, the two conducting bodies are formed from metal, in particular from the same metal. This can be, for example, aluminum. This is a particularly simple and cost-effective material for providing an electrically, conductive metal for the two conducting bodies. The insulation around the conducting bodies can be provided here both by the material of the basic body and by separate insulating means.

Furthermore, it may be of advantage if, in the case of an end plate according to aspects of the invention, the light element is designed for producing at least one of the following signaling functions of the vehicle;

a) brake light b) direction indicator c) position light
d) rear fog light, and
e) reversing light.

The list above is not a definitive list. Of course, two or more signaling functions can be combined in one and the same light element or a plurality of light elements with correspondingly in each case two separate electric conducting, bodies can be arranged within the end plate. A brake light should be understood as meaning the brake signaling for the vehicle. The direction indicator serves for signaling a lane change of the vehicle or for announcing a turning procedure. The position light of the vehicle is in particular usable in poor visibility conditions in order to make the outer contour of the vehicle better seen. The same is also true of the rear fog light. The reversing light serves to provide improved illumination of the rear surroundings of the vehicle in order more easily to be able to carry out a reversing function.

The subject matter of the present invention is also a rear spoiler for a vehicle, having an air directing wing for influencing the flow around the vehicle, wherein the two lateral end portions of the air directing wing each have an end plate according to aspects of the invention. The rear spoiler therefore affords the same advantages as have been explained in detail with respect to an end plate according to aspects of the invention. What are referred to as supply lines can be embedded within or arranged on the material of the air directing wing, which preferably has the mating basic body, already explained, in order to be able to provide a corresponding, supply by electrical contact with the individual electric conducting bodies in the respective end portion.

BRIEF DESCRIPTION OF THE DRAWINGS

Further advantages, features and details of the invention emerge from the description below in which exemplary embodiments of the invention are described in detail with reference to the drawings. The features mentioned in the claims and in the description may be essential to the invention in each case individually by themselves or in any combination. Schematically in the drawings:

DETAILED DESCRIPTION OF THE INVENTION

Figure 1:
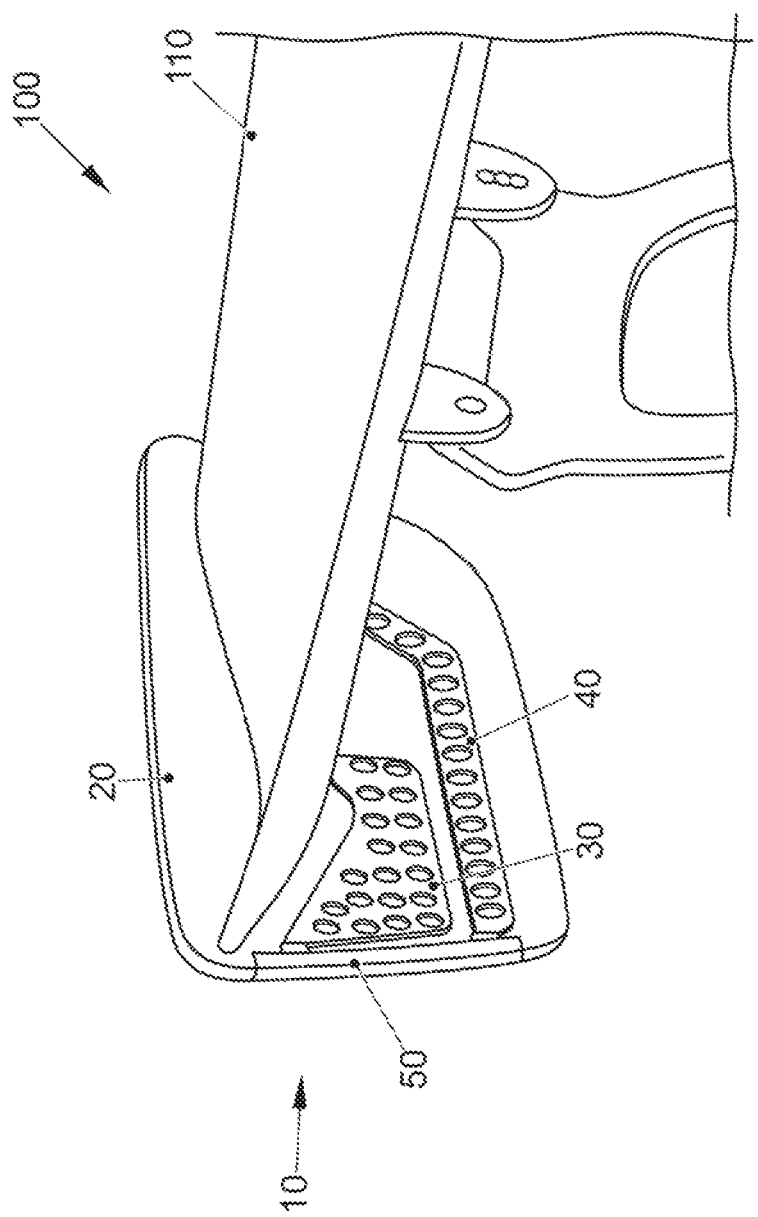
FIG. 1 shows an embodiment of an end plate according to aspects of the invention.
Figure 3:
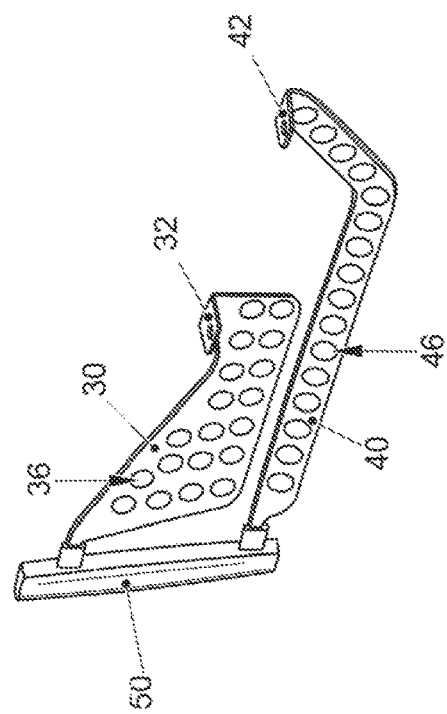
FIG. 3 shows the embodiment of FIGS. 1 and 2 without the basic body of the end plate.
Figure 5:
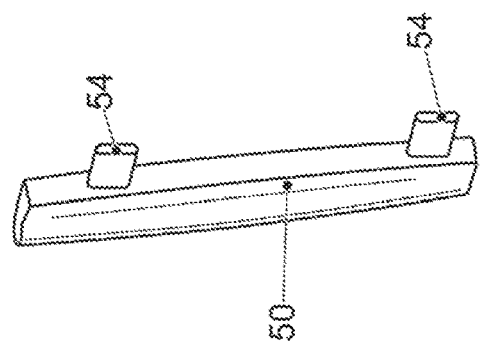
FIG. 5 shows the removed light element of the embodiment of FIGS. 1 to 4.
Figure 7:
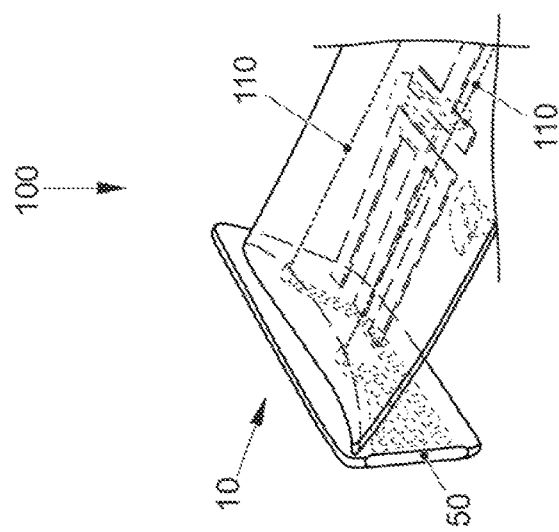
FIG. 7 shows a top view of the rear spoiler according to FIG. 6.
Figure 6:
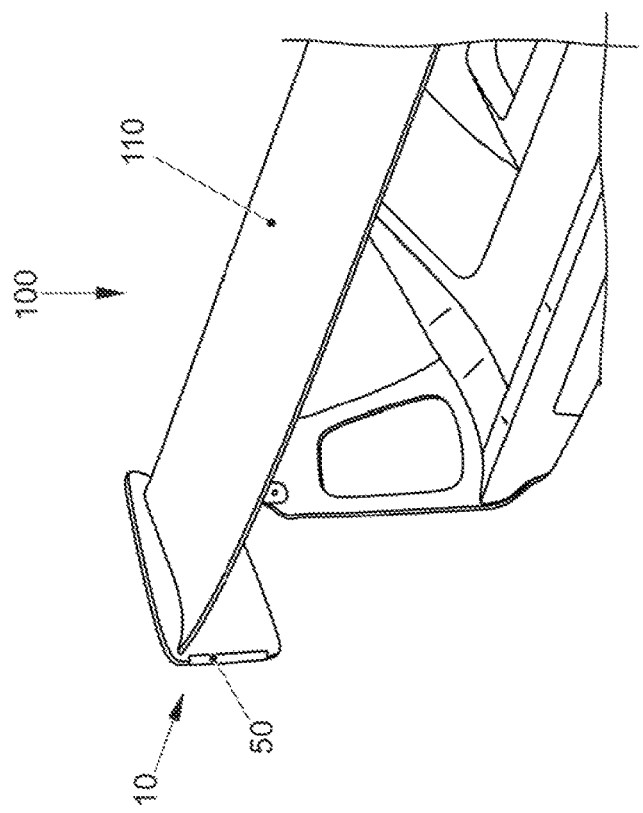
FIG. 6 shows rear spoiler according to aspects of the invention.

FIGS. 1 to 5 show an end plate 10 according to aspects of the invention which is assembled in FIGS. 1, 5 and 7 to form a rear spoiler 100 according to aspects of the invention. It can readily be seen in FIG. 1 how the end plate 10, which can preferably be arranged on both sides of an air directing element 110 of the rear spoiler 100, can be schematically formed. In particular, it can readily be seen in FIGS. 1 and 6 that an electric light element 50 is arranged on the rear edge of the basic body 20 of the respective end plate 10. This is, for example, a rear light or a brake light of the vehicle (not illustrated specifically). As soon as a braking operation of the vehicle is initiated, the corresponding light element 50 has to be supplied with the information and the electric current which is intended to provide light functionality.

In order to be able to provide the above electric light functionality by means of the electric light element 50, two separate electric conducting bodies 30 and 40 are formed within the basic body which is preferably formed here from a plastics material. The two conducting bodies 30 and 40 are of plate-like design here with a substantially flat extent. The two conducting bodies 30 and 40 extend here substantially completely within the material of the basic body 20 and are electrically insulated from each other by said material of the basic body 20. The electrical contact between the electric light element 50 and the two conducting bodies 30 and 40 is illustrated in more detail in particular in FIGS. 2 to 5.

Figure 2:
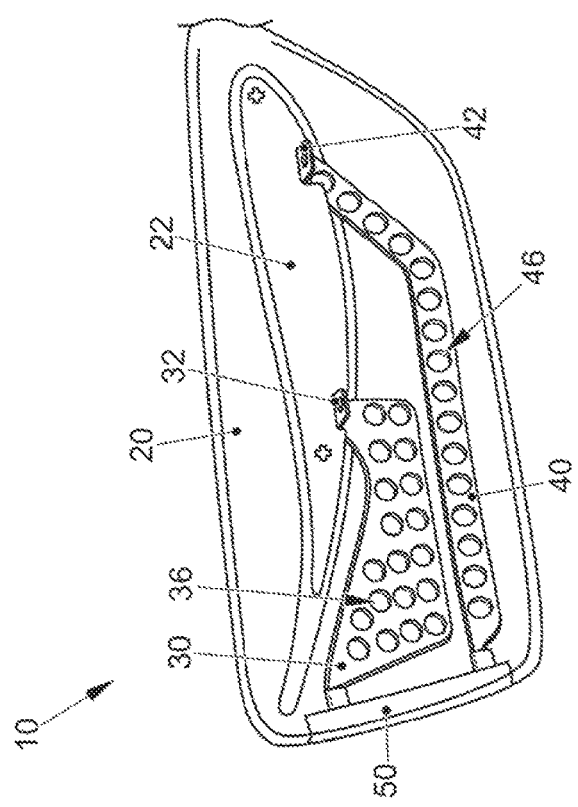
FIG. 2 shows the embodiment of FIG. 1 in a schematic isolated illustration.
Figure 4:
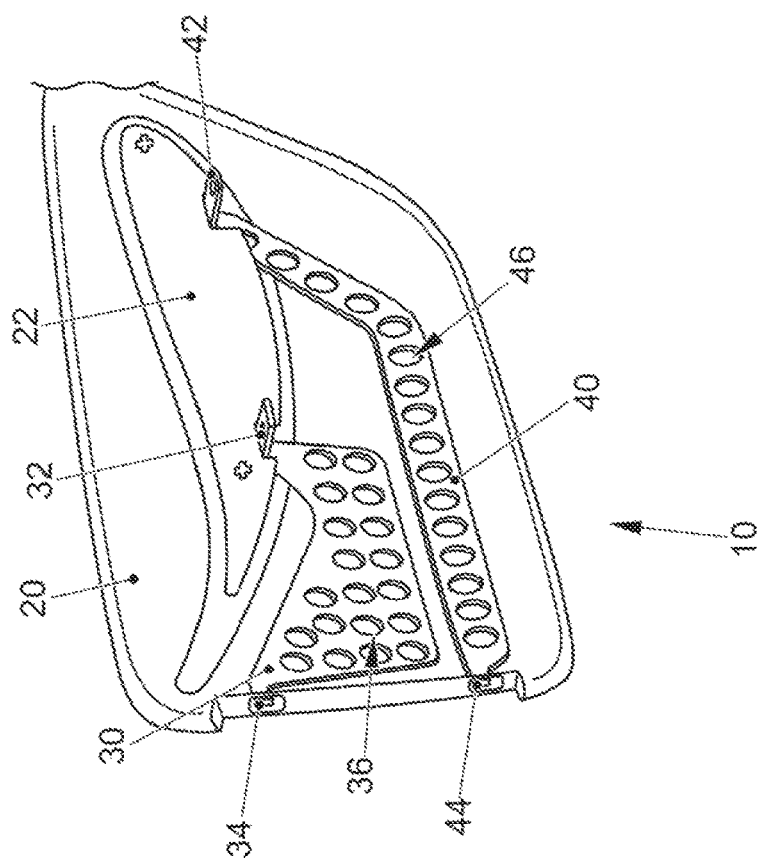
FIG. 4 shows the embodiment of FIGS. 1 to 3 with the light element removed.

While the assembled position is illustrated in FIG. 2, it can readily be seen in FIG. 4 how, when the light element 50 is removed, two connection portions 34 and 44 of the two electric conducting bodies 30 and 40 are exposed. The light element 50 is then plugged in a latching manner onto said two connection portions 34 and 44 with associated mating connection portions 54 and both the mechanical fastening and the electrical contact are thereby provided. Provided in a bent manner or in an angled manner at the other end in each case of the two conducting bodies 30 and 40 are contact portions 32 and 42 which extend beyond the side surface of the basic body 20 in the region of the fastening portion 22. As soon as an air directing wing 110 is then provided, the end plate 10 according to FIGS. 1 to 4 can then be placed on the corresponding side edge of the air directing wing 110. In the process, the two protruding contact portions 42 and 32 penetrate into corresponding receptacles, of the air directing wing 110 and can ensure both the electric connections and preferably also the mechanical fastening there. It is illustrated in FIG. 7 how an associated supply line 120 is guided to each of said two contact portions 32 and 42.

As is likewise illustrated in FIGS. 1, 2, 3 and 4, the plate-like extent o conducting bodies 30 and 40 are extents with a corresponding perforated structure 36 and 46. The holes are arranged here in a substantially identical size with a regular distribution. This serves to be able to ensure a reduction in the weight for said end plates 10 despite a Technical stabilizing effect for the entire end plate 10.

The above explanation of the embodiments describes the present invention exclusively within the scope of examples. Of course, individual features of the embodiments, if technically expedient, can be freely combined with one another without departing from the scope of the present invention.

What is claimed is:

1. An end plate for a rear spoiler of a vehicle, the end plate comprising:
   a basic body with a fastening portion for fastening to an air directing wing of the rear spoiler,
   a first electric conducting body arranged at east in first sections within the basic body,
   a second electric conducting body insulated electrically from the first electric conducting body and arranged at least in second sections within the basic body, and
   an electric light element which is electrically conductively connected to the two conducting bodies, wherein the electric light element is mounted to the basic body at a location spaced apart from and beneath the fastening portion for fastening to the air directing wing of the rear spoiler.

2. The end plate as claimed in claim 1, wherein the first conducting body and the second conducting body each have a contact portion for electrical contact with one supply line, wherein the contact portions are arranged on the fastening portion.

3. The end plate as claimed in claim 2, wherein the two contact portions protrude over a side surface of the basic body in a direction of the air directing wing.

4. The end plate as claimed in claim 1, wherein the two conducting bodies each have a connection portion for electrically conductive connection to the electric light element and for fastening of the electric light element.

5. The end plate as claimed in claim 1, wherein at least one of the two conducting bodies is a substantially flat plate.

6. The end plate as claimed in claim 1, wherein at least one conducting body has a perforated structure for weight reduction.

7. The end plate as claimed in claim 1, wherein the basic body is substantially composed of a plastic material.

8. The end plate as claimed in claim 1, wherein the two conducting bodies are formed from metal.

9. The end plate as claimed in claim 1, wherein the electric light element is configured for producing at lea one of the following signaling functions of the vehicle:

brake light;
direction indicator;
position light;
rear fog light; and
reversing light.

10. A rear spoiler of a vehicle comprising:
an air directing wing for influencing a flow of air around the vehicle; and
two end plates each mounted to a respective lateral end portion of the air directing wing,
wherein each end plate includes a basic body with a fastening portion for fastening to the air directing wing of the rear spoiler, a first electric conducting body arranged at least in first sections within the basic body, a second electric conducting body insulated electrically from the first electric conducting body and arranged at least in second sections within the basic body, and an electric light element which is electrically conductively connected to the two conducting bodies,
wherein each electric light element is mounted to the respective basic body at a location that is spaced apart from and beneath the fastening portion for fastening to the air directing wing of the rear spoiler.

11. The end plate as claimed in claim 1, wherein the electric light element is positioned at the perimeter of the basic body.

* * * * *